April 14, 1931.　　　　　L. E. BLOOD　　　　　1,801,244
MACHINE FOR PRODUCING WOODEN BLOCKS
Filed April 23, 1929　　　5 Sheets-Sheet 1

Inventor:
Laurence E. Blood
by Emery, Booth, Varney & Townsend
Attys

April 14, 1931.  L. E. BLOOD  1,801,244
MACHINE FOR PRODUCING WOODEN BLOCKS
Filed April 23, 1929  5 Sheets-Sheet 3

Inventor:
Laurence E. Blood,
by Emery, Booth, Varney & Townsend
Attys

April 14, 1931.   L. E. BLOOD   1,801,244
MACHINE FOR PRODUCING WOODEN BLOCKS
Filed April 23, 1929    5 Sheets-Sheet 4

Inventor:
Laurence E. Blood

April 14, 1931.  L. E. BLOOD  1,801,244
MACHINE FOR PRODUCING WOODEN BLOCKS
Filed April 23, 1929   5 Sheets-Sheet 5

Inventor:
Laurence E. Blood,
by Emery, Booth, Varney, Townsend
Att'ys

Patented Apr. 14, 1931

1,801,244

UNITED STATES PATENT OFFICE

LAURENCE E. BLOOD, OF BOSTON, MASSACHUSETTS, ASSIGNOR TO S. A. WOODS MACHINE COMPANY, OF BOSTON, MASSACHUSETTS, A CORPORATION OF MASSACHUSETTS

MACHINE FOR PRODUCING WOODEN BLOCKS

Application filed April 23, 1929. Serial No. 357,445.

This invention relates to woodworking machines, and particularly to a machine for producing blocks for use as flooring and the like by squaring up a rough block, ordinarily but not necessarily formed of short lengths of matched flooring strips or boards secured together, and shaping its edges in such manner as may be desired. My invention will be understood by reference to the accompanying drawings showing a single illustrative embodiment of the inventive idea and in which:—

Figure 10:
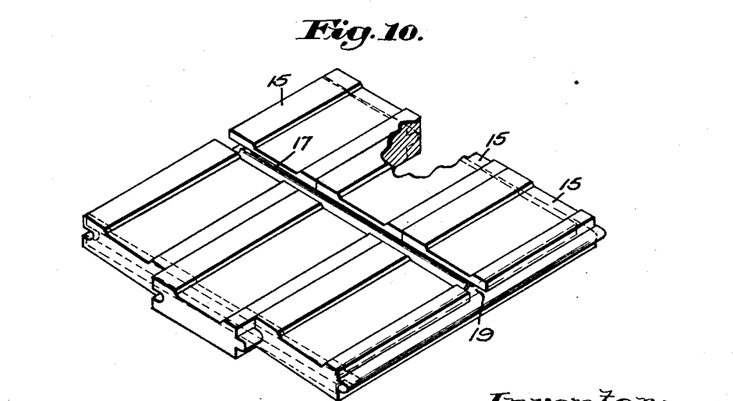
Fig. 10 is a perspective of a rough block and illustrates in dotted lines the finished product formed therefrom by the operation of the machine.

Referring to Fig. 10, I have there shown a rough block made up of short sections 15 of matched flooring of substantially equal lengths set together and secured by means of a metallic spline 17 compressed or upset in a groove 19 cut across the back of the assembled sections. The mechanism which I am about to describe serves to square up such a rough block and to shape the edges, for instance, by tonguing and grooving the same, as indicated by the dotted lines in the drawing.

The operation of the machine which I am about to describe is illustrative of a process which involves establishing one edge of a rough block as a work edge, feeding it forward at right angles to such edge, and during its travel operating on the ends of the block to square them relative to said end, then feeding the block by engagement with one of said ends at right angles to the latter and during its travel operating on the other edge to square it relatively to said ends and, if necessary or desirable, re-trimming the original work edge.

Figure 1:
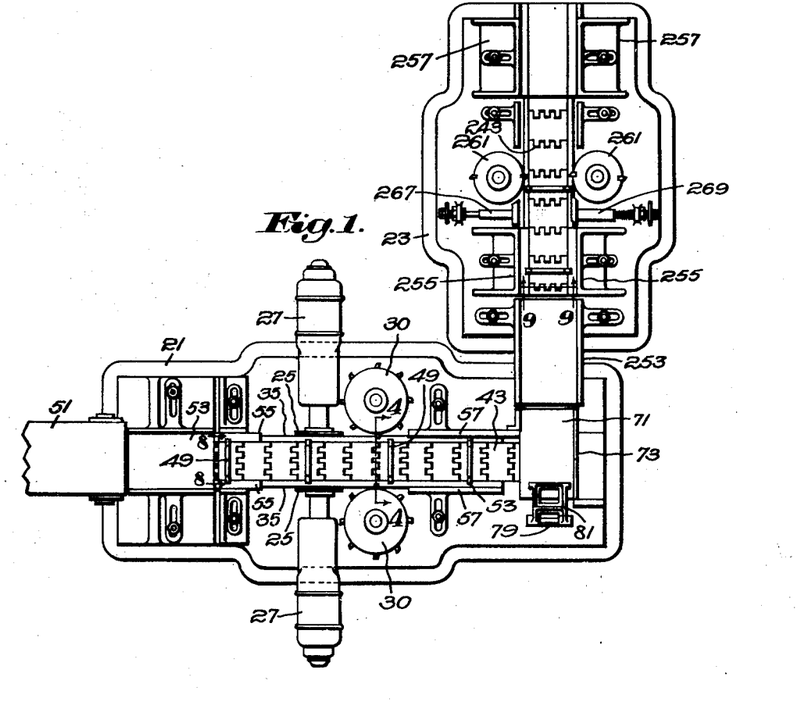
Fig. 1 is a simplified plan view of a machine embodying my invention with portions removed to show the construction beneath.

The embodiment of the invention shown comprises two mechanisms, shown in Fig. 1 as carried by the separate frames 21 and 23, through which the work travels. Herein the first operates on the cross-grain ends of the block as it is advanced at right angles to a work edge, conveniently one of the original mortise edges of the matched flooring, and trims the block to size and shapes said ends. The second operates to trim and shape the fourth edge accurately perpendicular to the ends just shaped and, if necessary, to re-trim the original work edge. Suitable means, herein a transfer mechanism, are provided for altering, between the two mechanisms just referred to, the orientation of the work piece relative to its direction of travel.

Figure 4:
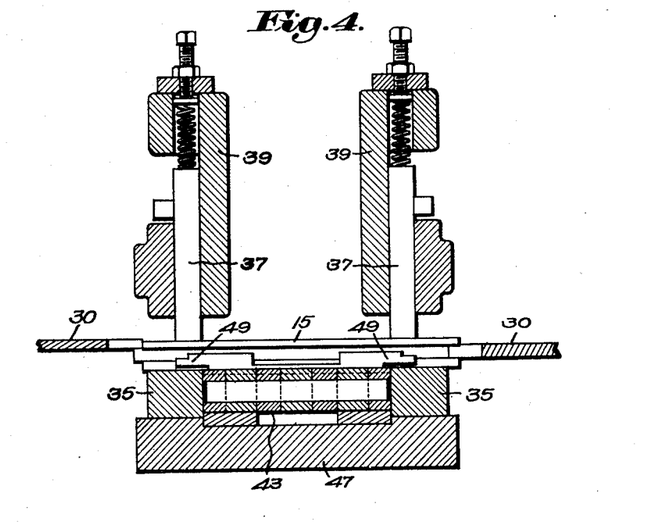
Fig. 4 is a fragmentary section on the plane 4—4 of Fig. 1.

The first mechanism in the machine shown (see particularly Figs. 1 and 2) embodies trim saws 25 mounted on horizontal shafts and herein shown as directly driven by the electric motors 27, these cutting mechanisms being transversely adjustable (see Fig. 2) on the gibbed ways 29. The saws 25 trim the block to the desired length measured along the grain, and in the embodiment of the invention shown the ends are tongued and grooved and for this purpose opposed grooving saws 30 are provided set on vertical shafts, these herein being shown (see Fig. 2) as direct driven by electric motors 31 and being transversely adjustable on the gibbed ways 33. As is customary in end-matching machines, if a tongue is to be cut, a suitable saw may be provided on one of the horizontal shafts driven by a motor 27 to cut one of the rabbets defining the same, and the succeeding rabbeting saw 30 (see Fig. 4) for that edge need cut only the upper rabbet. It is unnecessary to illustrate and describe this feature in detail.

Figure 2:
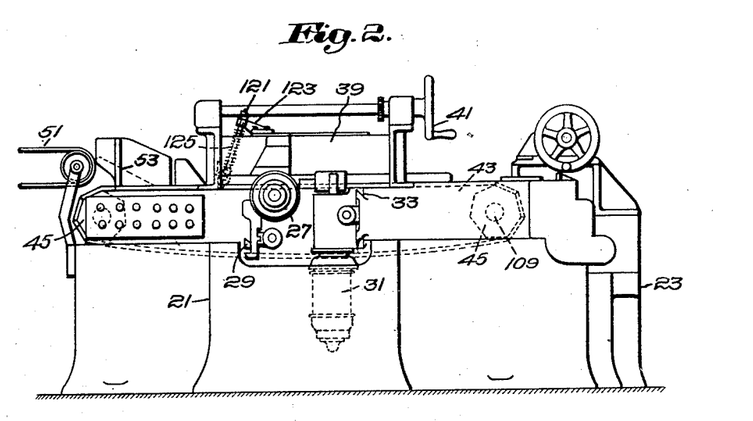
Fig. 2 is a simplified side elevation of the machine as seen from the lower side of Fig. 1 but with the parts omitted in Fig. 1 shown.

For operation of the cutting tools thereon (see Fig. 4) the rough block may be advanced over fixed rails 35 adapted to support it near its ends and against which it is held by the spring-pressed shoes 37 sliding in the frames 39, this whole mechanism being vertically adjustable by the hand wheel 41 (see Fig. 2). The construction of this supporting and hold-down mechanism is analogous to those utilized in end matchers, the construction here shown being of the face-down type and being characteristically distinguished by the relation of the supporting means to the ends of the piece of work.

The blocks may be advanced over the supporting rails 35 by means of a suitable conveyor, herein taking the form of a block chain 43, trained around sprockets 45, the upper run being received between the rails 35 and resting on a suitable support 47 over which it is drawn by means of suitable power applied to the forward sprocket. Rigidly related lugs 49, herein consisting of the integrally united ends of a single dog set into the upper face of a link, project over the rails 35 to engage the rear end of the block closely adjacent its ends and advance it under the hold-downs in a direction away from the reader viewing Fig. 4. The direction of travel being at a fixed angle (herein a right angle) to the connecting line of a pair of lugs, the block is advanced at a fixed angle to that edge thereof which is engaged by the lugs and in such a manner that it cannot cant or twist during the operation of the tools thereon. The trim saws being properly adjusted cut the block to a desired length and the several grooving saws shape the ends and these ends are perfectly square to the edge of the work engaged by the feeding lugs.

Referring to Figs. 1 and 2, the rough blocks may be delivered to the machine, for example, by means of a suitable conveyor 51 which may be supposed to lead from the assembling machine in which they are splined together, down a chute 53 and between transversely adjustable guides 55 upon the upper run of the conveyor chain, these guides 55 roughly centering the block thereon. After passing the cutting tools, they are delivered from underneath the hold-down mechanism between adjustable guides 57 to the output end of the mechanism.

Figure 3:
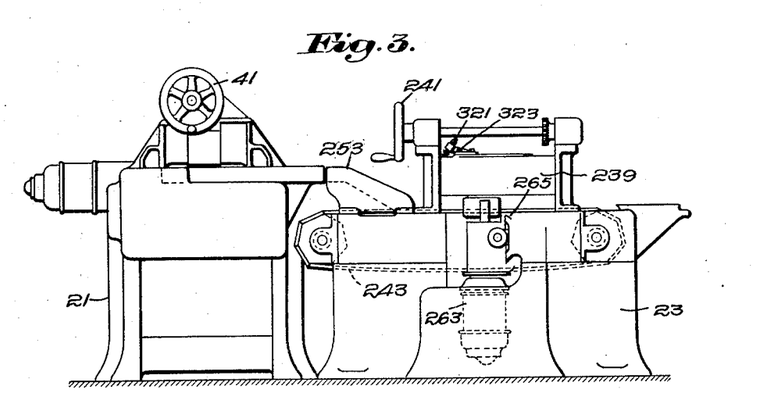
Fig. 3 is a similar view seen from the right of Fig. 1.

The second mechanism for trimming and shaping one or both of the sides of the block (see Figs. 1 and 3) may embody one or more matcher heads 261, herein shown as mounted on vertical shafts direct driven by motors 263 and adjustable transversely of the machine on the gibbed ways 265. These matcher heads operate on a block fed between them over suitable rails and under hold-down mechanism by means of a conveyor chain 243, the mechanism being substantially similar as to these details to the first mechanism. The blocks may be delivered upon chain 243 down a chute 253, the chain 243 of the second mechanism preferably operating at a lower plane than the chain 43 of the first mechanism (see Fig. 3) between guides 255 and be delivered at the output end of the machine between guides 257. Since the block is turned ninety degrees relative to the path of travel in passing from one mechanism to the other as, for instance, in the manner to be described, the original work edge is longitudinal. It is therefore convenient (see Fig. 1) to press this edge against a fixed guide 267 by means of an opposed yielding guide 269 located adjacent the matcher heads. Both guides have provision for transverse adjustment to provide for different sizes of blocks. Various parts of the second mechanism closely analogous to certain parts of the first are herein designated by the same numeral increased by 200 and need not specifically be described.

Figure 6:
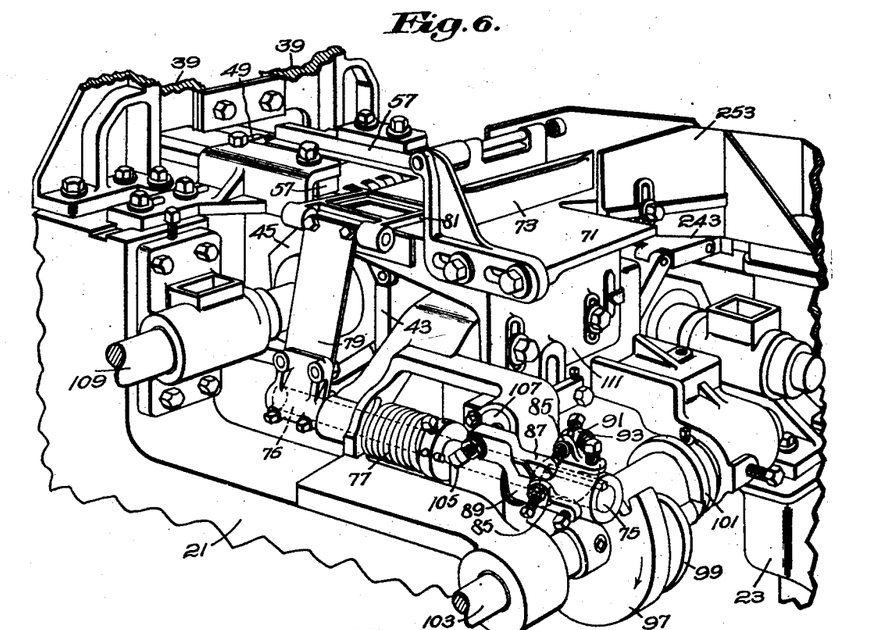
Fig. 6 is a fragmentary perspective view of the mechanism at the output end of the first unit at the right hand end of Fig. 2 and the left hand end of Fig. 3.
Figure 7:
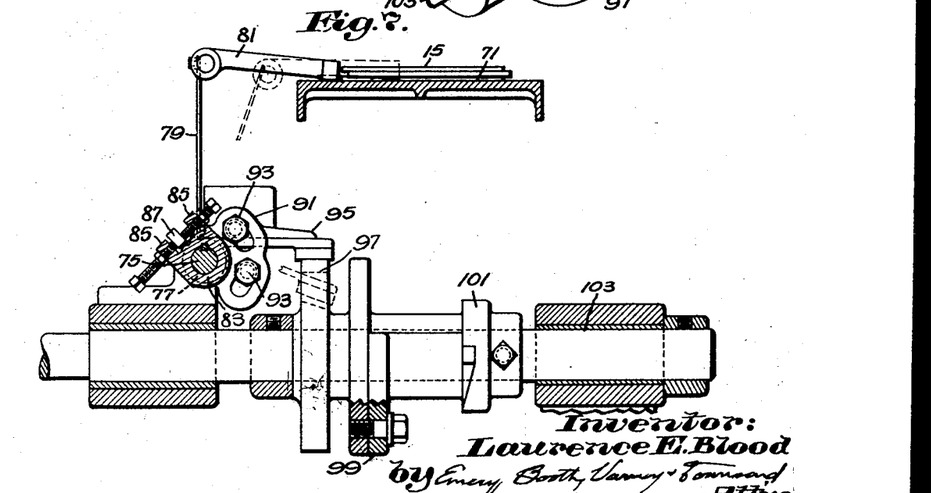
Fig. 7 is a selective end view of certain parts as seen from the right of Fig. 6 with parts in section.

In the embodiment of the invention shown, to permit the relative orientation between the block and its direction of travel to be changed, the center lines of the two mechanisms are disposed at right angles (see Fig. 1) and the partly finished block arriving at the output end of the first mechanism, rather than being rotated itself, is moved laterally at a relatively great speed out of the line of feed of that mechanism and upon the second conveyor 243. To permit this transfer to be effected rapidly while the mechanisms themselves operate continuously and at a suitable rate of speed, I prefer to project the block laterally by means of a suitable kicker. Referring to Figs. 6 and 7, the chain 43 may deliver a block on a table 71 against a spring-supported back fence 73 adjustable thereon. Mounted in suitable bearings in the frame of the machine adjacent this table and on the side remote from the second unit, I may provide a suitable rock shaft 75 normally pressed in a clockwise direction, viewing Figs. 6 and 7, by the powerful coil spring 77. An arm 79 extends upwardly from this rock shaft, this arm herein being shown as consisting of a flat plate of spring metal, and on the upper end of this arm is pivoted a skeletonized plate 81, the distal end of which rests under gravity on the face of the table 71, as best seen in Fig. 7. To operate the rock shaft a collar 83 thereon is provided with lugs 85 receiving adjusting screws which confine between them a lug 87 on a loose collar 89, this construction permitting desired angular adjustment between the parts. Suitable slotted flanges 91 on the collars may be provided with clamping bolts 93 to assist in maintaining the desired angular relation thereof. The collar 89 carries a lever arm 95 running on cam 97, herein shown as driven by the flanged coupling 99, which provides for angular adjustment thereof, and the one-way clutch 101 from a live shaft 103. An abrupt drop of the edge of cam 97 appears in Fig. 6, and it will be understood that in the operation of the parts the cam rotating clockwise in that figure rocks shaft 75 counterclockwise against the tension of the spring, withdrawing kicker plate 81 to the full line position of Fig. 7, and then as the lever arm 95 passes the nose of the cam, the rock shaft is released to the force of the spring and the parts come to the dotted line position of Fig. 6 and the kicker engages on the side of a block received on the table 71, projecting it off the same and down the chute 253 upon the conveyor 243 of the second unit of the machine. The nose of the cam is preferably rounded off as shown in Fig. 6, providing a slight recession just before the follower passes the same. This provides for moving the kicker plate 81 into contact with the edge of the block and starting the latter from rest with a slow powerful motion followed by a rapid push as the follower drops off the nose. An adjustable bolt 105 in lug 87 may serve as a stop striking preferably a rubber insert 107 in the frame of the machine.

The shaft 103 is, of course, driven in suitable timed relation to the feed of the blocks, for instance, from one of the sprocket shafts 109, but I have omitted any showing of the drive for this shaft or for the feeding mechanisms in order to simplify the disclosure and since the driving arrangements might be of any suitable character and may readily be supplied in serviceable form by one skilled in the art. The adjustment of cam 97 by means of the coupling 101 permits the timing to be properly effected.

Figure 5:
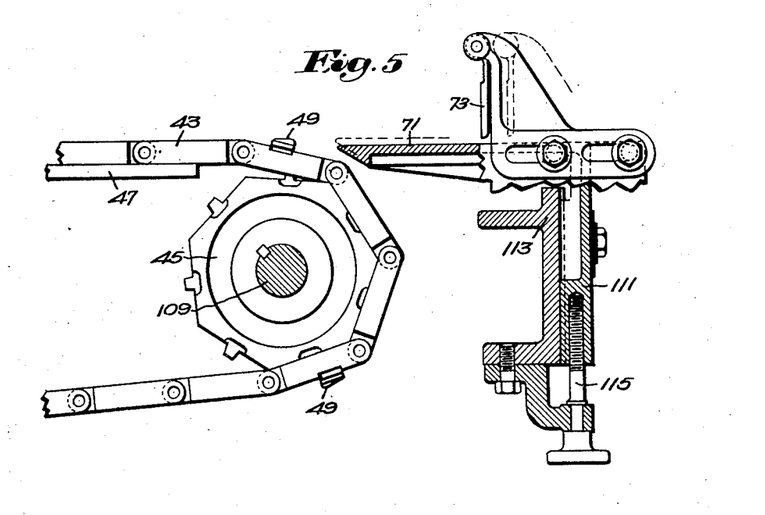
Fig. 5 is a fragmentary section at the output end of the first unit of the machine corresponding to the right hand end of Fig. 2.

The provision for adjustment of back fence 73 and of the sides of chute 253 and guide walls 255 permits the block to be delivered to the chain 243 in position for the proper operation thereon of right hand matcher head 261 (see Fig. 1). If both sides of the block are to be trimmed in the second mechanism, it is desirable that the center line of the block when delivered to the table for transfer be coincident with the center line of said second unit and with which preferably is aligned the center line of the kicker plate 81. In conjunction with the adjustability of the fence 73 shown in Fig. 6, this may be effected by providing for vertical adjustment of table 71 and the fence carried thereon, for instance, by providing the table with a depending vertical arm 111 slidable in a suitable way 113 on the frame of the machine and operated by adjusting screw 115. In the full line position of the parts shown in Fig. 5, the table is adapted to receive a relatively short block, and as the conveyor chain 43 moves onward from the position shown, the lugs 49 opposing the end of the block will drop below the plane of the latter after having pushed it against the fence 73 and leave it in position on the table. If it is desired to operate on a block of greater dimensions, the fence 73 may be adjusted rearwardly one half of the difference to the dotted line position shown and the table 71 raised by means of screw 115 to the dotted line position. Because of this vertical adjustment the lugs 49 will drop below the edge of the block supported on the table before they have moved so far to the right in the figure as in the former case and the longer block is thus positioned on the table centered on the same center line as the shorter block and centered with respect to the center line of the second mechanism.

Figure 8:
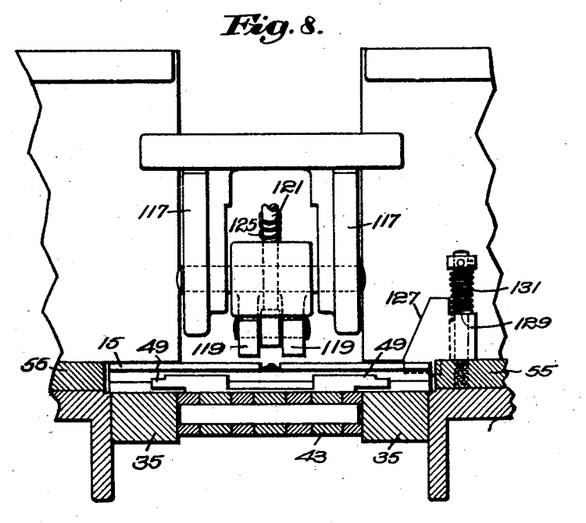
Fig. 8 is a fragmentary section substantially on the line 8—8 of Fig. 1.

In Fig. 8 I have shown the gauges and stops controlling the entrance of a piece of work beneath the hold-down mechanism of the first unit. Journalled in suitable depending arms 117 on the supporting framework of this hold-down mechanism at the intake end thereof there may be provided stop fingers 119 projecting downwardly towards the rails 35 to such a position as to prevent more than one block at a time passing beneath them. A rod 121 (see Fig. 2) may extend rearwardly and upwardly from these fingers to a bracket 123 at the top of the framework and receive the spring 125 supporting the fingers in position. In the case of this unit this spring constitutes a safety device and is so tensioned that in the normal operation of the machine the springs do not yield. The gauging mechanism proper may comprise a gate-like member 127 opposing one of the rails 35 and projecting into the path of the block thereon to be engaged by the front edge thereof, this member being pivoted on a vertical pin 129 arising from one of the guide rails 55 normally supported in the position of Fig. 8 by a torsion spring 131 of relatively slight force which yields to permit the passage of the block while offering sufficient resistance to cause a block delivered on top of the conveyor to be positioned in front of the pair of lugs 49 and to rest squarely thereagainst.

Figure 9:
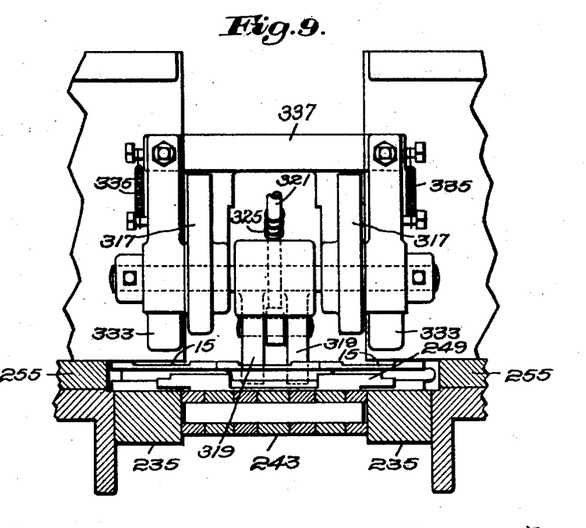
Fig. 9 is a similar section substantially on the line 9—9 of Fig. 1.

In the case of the second mechanism (see Fig. 9) there are journalled in similar arms 317 fingers 319 which in this case, however, project down closely adjacent the chain 243. It is supported in position by a rod 321 and spring 325 similar to the parts in the first mechanism, but in this case the spring 325 is relatively lightly tensioned and in the normal operation of the parts the fingers yield to permit the passage of successive blocks. Stop means to prevent more than one block passing at a time and yieldable only in case of emergency and corresponding in function to the fingers 119 of the first unit are herein provided by the laterally disposed fingers 333 mounted on the extended end of the journal and normally held in a substantially vertical position by means of the strong helical springs 335. A bar 337 is here shown joining the upper ends of the fingers so that they move as a unit.

More particularly in case of the first mechanism I prefer to use a gauge such as 115 which yields in a horizontal plane. If the roughly assembled block prior to passing under the hold-down shoes 37, whether because of the connection of its parts by means of spline 17 or otherwise, is warped or curved in the direction of feed, the gauge yielding in the plane of travel exerts no tilting force such as might lift the rear end of the block over the feeding dog, permitting the latter to pass beneath the block and jam it against an overhanging part.

I am aware that the invention may be embodied in other specific forms without departing from the spirit or essential attributes thereof, and I therefore desire the present embodiment to be considered in all respects as illustrative and not restrictive; reference being had to the appended claims rather than to the foregoing description to indicate the scope of the invention.

Claims:

1. In a woodworking machine, in combination with a pair of endless circulating conveyors and means for maintaining the direction of travel of the upper run thereof, each conveyor comprising unitary interlinked parts having transversely aligned, rigidly related means for engaging a piece of work at spaced points adjacent the edges thereof to advance the same, means for operating on the edges of the work on one conveyor, means to operate on an edge of the work on the second conveyor, and means for transferring a piece of work from the one conveyor to another effective to present one of the edges operated on while on the first conveyor to the advancing means of the second.

2. In a woodworking machine, in combination with a pair of endless circulating conveyors and means for maintaining the direction of travel of the upper run thereof, each conveyor comprising unitary interlinked parts having transversely aligned, rigidly related means for engaging a piece of work at spaced points adjacent the edges thereof to advance the same, means for operating on the edges of the work on one conveyor, means to operate on an edge of the work on the second conveyor, said conveyors being angularly disposed, and means to kick over a piece of work from the output end of one conveyor upon the intake end of the second.

3. In a woodworking machine, in combination with a pair of endless circulating conveyors and means for maintaining the direction of travel of the upper run thereof, each conveyor comprising unitary interlinked parts having transversely aligned, rigidly related means for engaging a piece of work at spaced points adjacent the edges thereof to advance the same, means for operating on the edges of the work on one conveyor, means to operate on an edge of the work on the second conveyor, said conveyors being angularly disposed, a chute from adjacent the output end of the first conveyor extending over the intake end of the second, and kick-over means adapted to project a piece of work delivered by the first conveyor in a relatively angular direction down said chute upon the second conveyor.

4. In a woodworking machine, in combination with a circulating conveyor having rigidly related means for engaging a piece of work adjacent the end edges thereof, tools adjacent said conveyor for operating on edges of the work thereon, a table on which the work is delivered from the upper run of said conveyor, a like conveyor aligned with said table and extending at right angles to the first, one or more tools adjacent said conveyor for operating on edges of the work thereon, and a device for kicking successive pieces of work off said table upon said second conveyor.

5. A woodworking machine for trimming relatively angular boundaries of a piece of work comprising a first conveyor of the circulating type, means for cutting work thereon, a table at the outlet end of said conveyor to receive pieces of work from the upper run thereof, said table being vertically adjustable relative to the conveyor, a second conveyor aligned with the table at an angle to the first, means for cutting work on said second conveyor, and means to discharge successive pieces of work from the table upon the second conveyor.

6. A woodworking machine for trimming relatively angular boundaries of a piece of work comprising a first conveyor of the circulating type, means for cutting work thereon, a table at the outlet end of said conveyor to receive several pieces of work from the upper end thereof, said table being vertically adjustable relative to the conveyor, a back fence on the table adjustable in the line of feed of said conveyor, a second conveyor aligned with the table at an angle to the first, means for cutting work on said second conveyor, and means to discharge successive pieces of work from the table upon the second conveyor.

7. In combination with a pair of conveyors for moving pieces of work successively past tools, one extending substantially at right angles from adjacent the output end of the other, a table on which the piece is delivered from the said other conveyor and from which it is delivered to said one conveyor, and means to project the piece from said table comprising a kicker adapted to move over the face of the table and means to give said kicker an initial movement into contact with the piece and a subsequent rapid projecting movement.

8. In combination with a pair of conveyors for moving pieces of work successively past tools, one extending substantially at right angles from adjacent the output end of the other, a table on which the piece is delivered from the said other conveyor and from which it is delivered to said one conveyor, and means to project the piece from said table comprising a rock shaft, an arm embodying a spring plate carried thereby, a kicker plate on said arm extending over the table and means for oscillating the shaft.

9. In combination with a pair of conveyors for moving pieces of work successively past tools, one extending substantially at right angles from adjacent the output end of the other, a table on which the piece is delivered from the said other conveyor and from which it is delivered to said one conveyor, and means to project the piece from said table comprising a rock shaft, an arm carried thereby, a kicker plate on said arm extending over the table, a spring acting on the shaft for projecting the kicker plate, and a cam to actuate the shaft against the spring.

10. In combination with a pair of conveyors for moving pieces of work successively past tools, one extending substantially at right angles from adjacent the output end of the other, a table on which the piece is delivered from the said other conveyor and from which it is delivered to said one conveyor, and means to project the piece from said table comprising a rock shaft, an arm carried thereby, a kicker plate on said arm extending over the table, a spring acting on the shaft for projecting the kicker plate, collars fast and loose on said shaft respectively, means for securing them together in adjusted angular relation, a lever on said loose collar, and a cam acting on the lever to actuate the shaft against the spring.

11. In combintion with a pair of conveyors for moving pieces of work successively past tools, one extending substantially at right angles from adjacent the output end of the other, a table on which the piece is delivered from the said other conveyor and from which it is delivered to said one conveyor, and means to project the piece from said table comprising a rock shaft, an arm carried thereby, a kicker plate on said arm extending over the table, a spring acting on the shaft for projecting the kicker plate, collars fast and loose on said shaft respectively, one collar having a lug and the other an adjustable bolt confining the lug between them, a lever on said loose collar and a cam acting on the lever to actuate the shaft against the spring.

12. In combination with a pair of conveyors for moving pieces of work successively past tools, one extending substantially at right angles from adjacent the output end of the other, a table on which the piece is delivered from the said other conveyor and from which it is delivered to said one conveyor, and means to project the piece from said table comprising a rock shaft, an arm carried thereby, a kicker plate on said arm extending over the table, a spring acting on the shaft for projecting the kicker plate, a lever arm angularly adjustable about said rock shaft, a shaft driven in timed relation to the conveyors, and a cam angularly adjustable about said shaft acting on the lever to actuate the shaft against the spring.

13. In combination with a pair of conveyors for moving pieces of work successively past tools, one extending substantially at right angles from adjacent the output end of the other, a table on which the piece is delivered from the said other conveyor and from which it is delivered to said one conveyor, and means to project the piece from said table comprising a rock shaft, an arm carried thereby, a kicker plate on said arm extending over the table, a spring acting on the shaft for projecting the kicker plate, a lever arm projecting from the shaft, and a cam operating on the lever arm for actuating the shaft against the spring having an abrupt drop serving to release the rock shaft to the spring, which drop is preceded by a slight recession.

14. In combination with a pair of conveyors for moving pieces of work successively past tools, one extending substantially at right angles from adjacent the output end of the other, a vertically adjustable table having an adjustable back fence on which table the piece is delivered from said other conveyor and from which it is delivered to said one conveyor, and means to project the piece from the table comprising a rock shaft, an arm carried thereby, a kicker plate pivoted to said arm with its distal end resting on the table and a spring and cam for oscillating the shaft.

In testimony whereof, I have signed my name to this specification.

LAURENCE E. BLOOD.

CERTIFICATE OF CORRECTION.

Patent No. 1,801,244. Granted April 14, 1931, to

LAURENCE E. BLOOD.

It is hereby certified that error appears in the printed specification of the above numbered patent requiring correction as follows: Page 4, line 114, claim 6, strike out the word "several", and in line 115, of same claim, for "end" read run; and that the said Letters Patent should be read with these corrections therein that the same may conform to the record of the case in the Patent Office.

Signed and sealed this 5th day of May, A. D. 1931.

(Seal)

M. J. Moore,
Acting Commissioner of Patents.